A. A. BOWSER.
CHECK VALVE.
APPLICATION FILED SEPT. 15, 1913.
1,147,840.
Patented July 27, 1915.
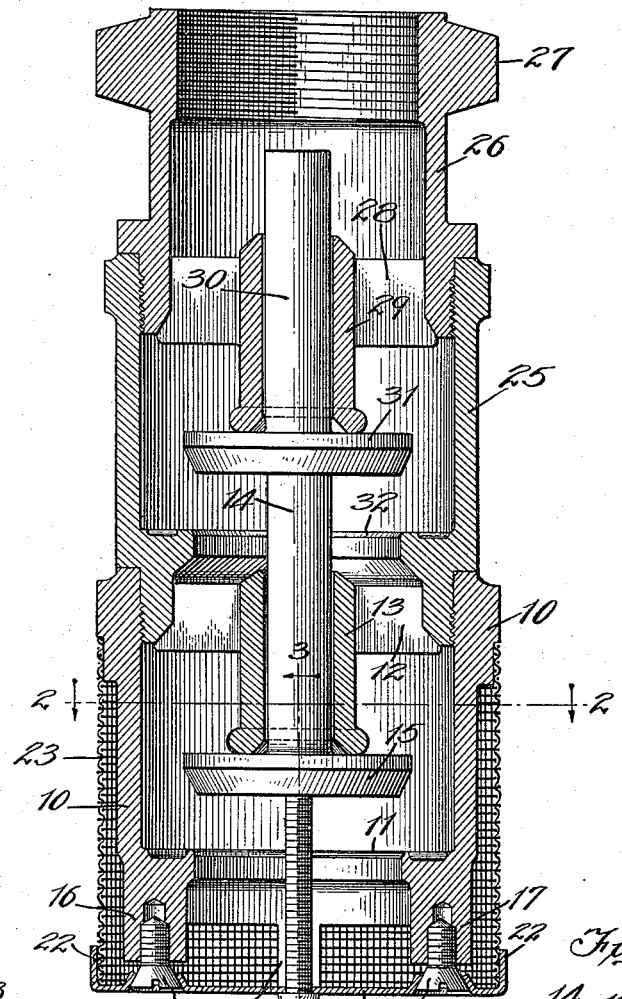
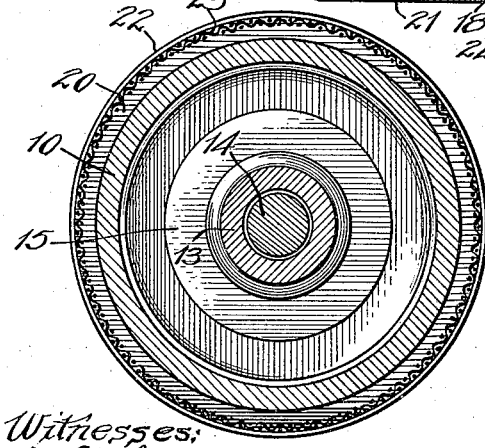
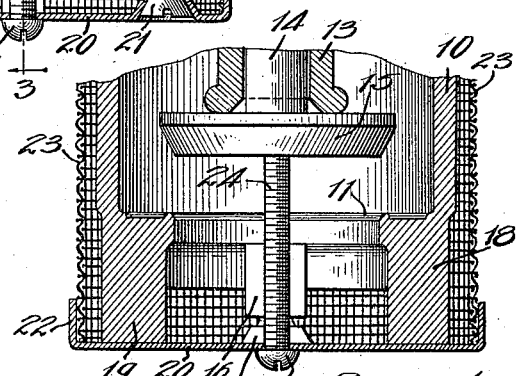
Witnesses:
W. F. Kilroy
Chas. Koursh.
Inventor:
Allen A. Bowser,
By Brown, Hopkins, Nissen & Sprinkle,
Attys.

UNITED STATES PATENT OFFICE.

ALLEN A. BOWSER, OF FORT WAYNE, INDIANA.

CHECK-VALVE.

1,147,840.  Specification of Letters Patent.  Patented July 27, 1915.

Application filed September 15, 1913. Serial No. 789,760.

*To all whom it may concern:*

Be it known that I, ALLEN A. BOWSER, a citizen of the United States, residing at Fort Wayne, in the county of Allen and State of Indiana, have invented certain new and useful Improvements in Check-Valves, of which the following is a specification.

My invention relates to check valves and has for its primary object the provision of an improved check valve which shall have improved means for securing perfect and uninterrupted operation.

With the above and other objects in view, this invention consists substantially in the combination, arrangement and construction of parts all as hereinafter described, shown in the accompanying drawings which form a part of this specification and show the preferred embodiment of my invention, and more specifically set forth in the subjoined claims.

In the drawings: Figure 1 is a vertical section of my improved valve. Fig. 2 is a horizontal section taken on the line 2—2 of Fig. 1 and looking in the direction indicated by the arrows. Fig. 3 is a vertical section of my invention taken approximately on the line 3—3 of Fig. 1 and looking in the direction indicated by the arrows.

Reference numeral 10 indicates a cylindrical valve chamber having its upper and lower ends open for the passage of fluid and provided adjacent its lower end with a valve seat 11. Extending across the upper opening of the chamber 10 is a spider 12 carrying a guideway 13. Mounted for vertical movement in the guideway 13 is a valve stem 14, upon the lower end of which is positioned a valve 15 which coöperates with the valve seat 11. The spider 12 offers no practicable obstruction to the passage of liquid through the valve chamber 10. Disposed about the lower opening of the valve chamber 10 are four feet, 16, 17, 18, and 19. A bottom plate 20 is positioned transversely across the bottom of the chamber 10 and abuts against the feet 18 and 19, which are preferably somewhat longer than the feet 16 and 17. This bottom plate is secured in position preferably by means of set screws 21, which pass through it and engage tapped holes in the feet 16 and 17. The outer periphery of the bottom plate 20 is upturned to form a flange 22. An inclosure 23 of foraminated material surrounds the chamber 10 and for the greater part of its length is spaced therefrom, being preferably bottomed upon the plate 20. The bottom plate 20 is provided with a central tapped aperture, which is engaged by a screw 24. The screw 24 is movable in the aperture to raise the valve 15 and its stem 14 off the seat 11 and maintain them in that position, or it may be moved downwardly out of contact with the valve.

A second valve chamber 25, open at its upper and lower ends, is secured to the upper end of the valve chamber 10 in any suitable manner, and the spider 12 may be formed across the bottom of the chamber 25 instead of being secured to the upper end of the chamber 10. Secured in any suitable manner to the upper end of the chamber 25 is a nipple 26, preferably provided with a squared extension 27 for engagement with a wrench and tapped at its upper extremity for threaded connection to a liquid conveying system. A spider 28 is formed preferably across the lower opening of the nipple 26 and carries a guideway 29 similar to the guideway 13. Mounted for vertical movement in the guideway 29 is a valve stem 30 similar to the stem 14, to the lower end of which is secured a valve 31. A valve seat 32 is formed in the lower opening of the chamber 25 and coöperates with the valve 31.

My invention is particularly useful in connection with pumping systems where, for instance, the pump is located above ground and the liquid to be pumped is stored in an underground tank. In such an application of my valve the suction pipe from the pump bears at its lower end within the storage tank the valve described. All liquid drawn from the tank by the pump passes through the foraminated material 23 and up through the valve seats 11 and 32, and the nipple 26, opening the valves in the ordinary manner in its passage. When the upward passage of liquid ceases, the valves 15 and 31 drop into their respective seats 11 and 32, thus maintaining a column of liquid above them and preventing leakage of the liquid back into the storage tank.

It is an advantage of my invention that the spider 12 is located above the valve 15 and its seat 11. Heretofore it has been common to locate the spider 12 and guideway 13, together with the stem 14, in a position beneath the valve 15, and by such construction dirt collected upon the spider has been frequently drawn into the valve seat, thereby preventing perfect closing of the valve and giving rise to leakage.

Another advantage of my invention lies in the provision of means for holding the valve 15 off its seat, as well as the valve 31. This is of material importance in the shipment of such valves, for the reason that in shipment the vibration of the conveyances would give rise to abrasion of the valves and their seats, were the valves allowed to rest upon their seats. By providing the screw 24, or some other device the valve 15 is held from its seat during shipment and its stem 14, protruding upwardly, contacts with the valve 31, holding it likewise off its seat.

In the accompanying drawings and in the foregoing description is set forth the preferred embodiment of my invention, but it is obvious that one skilled in the art may make modifications thereof without departing from the spirit of the invention.

I claim:

1. The combination with a valve chamber, of a valve seat formed therein, a puppet valve engaging the seat, a guideway for the valve positioned above the seat, a transverse plate secured in spaced relation to the bottom of the valve chamber, foraminated material spaced from but inclosing the valve chamber and bottomed upon the plate, and a screw movable in a threaded aperture of the plate and contacting with the puppet to hold the valve open at will.

2. The combination of a valve chamber, a plurality of valve seats formed therein, puppets engaging the seats with a valve stem extending upwardly from each puppet, and a separate guide above each puppet through which its stem passes, the lowest puppet being movable to engage its stem with the puppet above for raising the puppets above from their seats when the lowermost is raised from its seat.

3. The combination with a valve chamber having positioning lugs at spaced distances apart about the lower opening of the chamber and depending therefrom, a valve within the chamber, a bottom plate secured to the lugs and having an upturned flange extending beyond the lugs, and a screen surrounding the chamber at a spaced distance therefrom bearing at the upper end against the chamber and at the lower end against the plate where it is held in place by the flange.

4. The combination of a valve chamber, a plurality of valve seats formed therein, puppets engaging the seats with a valve stem extending upwardly from each puppet, a guide above each puppet through which the stem passes, each lower puppet being movable to engage its stem with the puppet above for raising all the puppets from their seats when the lowermost is raised a predetermined amount, and means contacting with the lowermost puppet to raise all the puppets from their seats at will.

5. The combination of a valve chamber, a plurality of valve seats formed therein, puppets engaging the seats, a stem upon each puppet extending upwardly therefrom, each of said stems being movable to engage the next superposed puppet to raise it from its seat, and means contacting with the lowermost puppet to raise all the puppets from their seats at will.

6. The combination with a valve chamber, of a plurality of valve seats formed therein, one above the other, puppets engaging the valve seats, a stem upon each puppet extending upwardly therefrom and movable into contact with the next superposed puppet, a guideway for the lowermost stem positioned above the lowermost valve, and a movable member for maintaining the puppets off their seats at will.

7. In a puppet valve, the combination with the valve chamber of a valve seat formed therein, a puppet upon the seat and movable upwardly therefrom, a stem upon the upper side of the puppet, a guideway for the stem positioned above the valve seat, positioning lugs about the lower opening of the chamber and depending therefrom, a bottom plate transversely positioned in spaced relation to the lower opening of the chamber, an upturned flange about the plate, an inclosure of foraminated material for the valve chamber bottomed upon the plate, and a traveling screw movable in a centrally disposed tapped aperture in the plate to contact with the puppet and maintain the valve open at will.

In testimony whereof I have signed my name to this specification, in the presence of two subscribing witnesses, on this 11th day of September A. D. 1913.

ALLEN A. BOWSER.

Witnesses:
J. R. MATLACK,
L. W. THOMAS.

Copies of this patent may be obtained for five cents each, by addressing the "Commissioner of Patents, Washington, D. C."